Patented Jan. 12, 1932

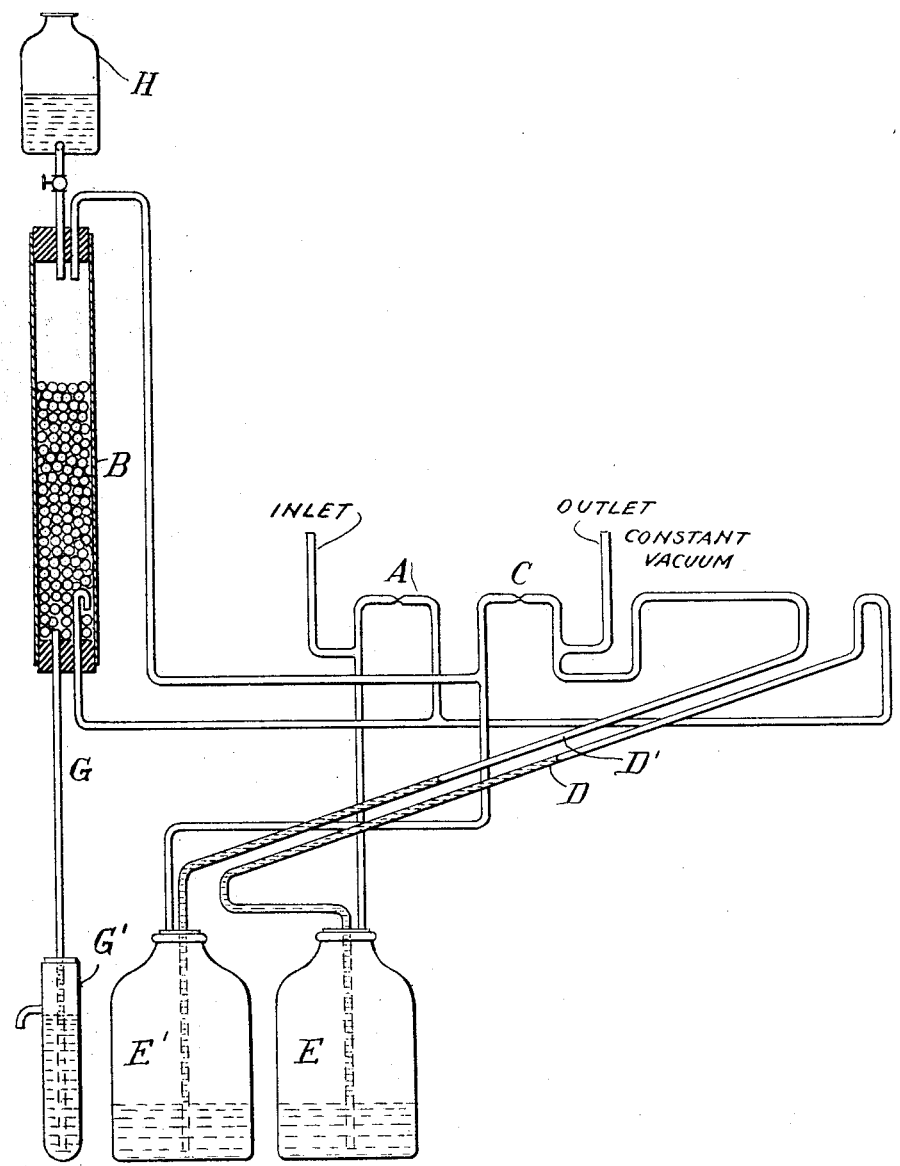

1,840,952

UNITED STATES PATENT OFFICE

ARTHUR H. HENNINGER, OF FLUSHING, NEW YORK, ASSIGNOR TO GENERAL CHEMICAL COMPANY, OF NEW YORK, N. Y., A CORPORATION OF NEW YORK

METHOD FOR DETERMINING SULPHUR DIOXIDE, HYDROGEN SULPHIDE OR BOTH IN GAS MIXTURES

Application filed November 5, 1926. Serial No. 146,297.

The present invention relates to the quantitative determination of sulphur dioxide and/or hydrogen sulphide in gases or gas mixtures and is particularly useful in determining the total amount of both sulphur dioxide and hydrogen sulphide present in a gas mixture such as may result from the carbonaceous reduction of sulphur dioxide gas.

The present invention aims to provide a ready, rapid and accurate method of determining the amount of sulphur dioxide and/or hydrogen sulphide in gas mixtures containing in addition to these sulphurous gases, carbonyl sulphide, carbon dioxide, carbon monoxide, methane, oxygen, hydrogen, nitrogen, and unsaturated hydrocarbons.

The invention may be applied to the analyses of gas mixtures by means of the well-known Hempel or Orsat apparatus or it may be adapted to continuously and automatically indicate the amount of sulphur dioxide and/or hydrogen sulphide in a gas stream so that the character and quality of the gas may be under observation at all times. The accompanying drawing shows one type of apparatus in which my invention may be practiced.

It is well known that iodine solutions absorb and oxidize both sulphur dioxide and hydrogen sulphide to form hydriodic acid and sulphuric acid and elemental sulphur under certain conditions, according to the following reactions:

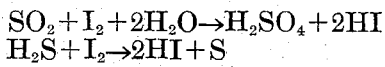

$$SO_2 + I_2 + 2H_2O \rightarrow H_2SO_4 + 2HI$$
$$H_2S + I_2 \rightarrow 2HI + S$$

These reactions have been applied in the analyses of these gases as for example in the well-known Reich method. However, this principle, so far as is known to me, has not been applied to a method of determining quantitatively sulphur dioxide and/or hydrogen sulphide in the presence of carbon dioxide by volumetric change as for example in the Orsat, Hempel, or automatic recording apparatus. This may be attributed to the fact that in attempting to determine sulphur dioxide and/or hydrogen sulphide volumetrically, by means of the Hempel pipette or similar apparatus employing the ordinary iodine solution, large errors are found, caused by the absorption of other gases, notably carbon dioxide, usually present in the gas mixture undergoing analysis.

I have found that this difficulty may be overcome and a rapid and accurate method provided for determining sulphur dioxide and/or hydrogen sulphide in gas mixtures containing carbonyl sulphide, carbon monoxide, hydrogen, carbon dioxide, and unsaturated hydrocarbons as well as other gases, by the addition of a substance to the absorbing iodine solution which represses the solution of carbon dioxide.

My invention consists in a novel absorbing liquid and in the method of employing such novel liquid in a Hempel, Orsat, or other gas measuring apparatus, said novel absorbent consisting of an iodine solution, preferably a concentrated aqueous solution containing iodine and potassium iodide, together with a concentrated solution of a salt such as calcium chloride or magnesium chloride. I prefer also to add a small amount of acid such as hydrochloric acid or sulphuric acid in order to decompose or neutralize any basic salt which may occur in the solution, although when the calcium chloride or magnesium chloride is substantially pure the addition of acid is unnecessary.

Without limiting myself to the exact amounts I give the following example of a solution to be used in the absorption which I have found to be most satisfactory; 100 cc. of a saturated solution of calcium chloride (45° Bé.) is added to a mixture of 27 grams of potassium iodide, 9 grams of iodine, 58 cc. of water, and 5 cc. of hydrochloric acid (Sp. Gr. 1.18). This solution absorbs substantially no carbon dioxide from gas mixtures containing 20% of that constituent, neither does it absorb any of the constituents of carburetted water gas which ordinarily contains 4% carbon dioxide and 10% unsaturated hydrocarbons. The solution is rapid and effective for the absorption of sulphur dioxide and/or hydrogen sulphide when used for example in the Hempel pipette, absorbing 50 cc.

of the former gas in 10 seconds and 10 cc. of the latter in 20 seconds.

In employing my novel absorbing solution, I fill the absorption bulb of a Hempel or Orsat apparatus therewith. A definite quantity of a gas mixture to be examined, is measured into the gas burette associated with the absorption bulb, and this known volume of gas contacted with the absorbing liquid in the well-known manner. The liquid very rapidly absorbs all the sulphur dioxide and/or hydrogen sulphide present in the gas mixture but does not effect a volume change upon the other gases present. The remaining gas is then returned to the burette where the new volume is measured, and the amount of sulphur dioxide and/or hydrogen sulphide determined by a comparison of the change in volume before and after treatment with the absorbing liquid.

Referring now to the accompanying drawing, I will describe more specifically how my invention may be applied to the continuous and automatic determination of sulphur dioxide and/or hydrogen sulphide in gas mixtures.

The gas entering at the inlet after suitable filtration to free it from solid particles passes through a capillary flow meter A. The flow meter A is connected at one end of an inclined gauge D and at the other end to a large reservoir E. The gas after leaving the capillary flow meter passes through an absorption tower B, filled with beads or other suitable non-corrodible material, in counter-current flow to a descending stream of the novel absorbing liquid of my invention which is supplied in regulated amount from the reservoir H. In this tower the hydrogen sulphide and/or sulphur dioxide are absorbed. The residual gas is conducted to a second capillary flow meter C and thence to the outlet. The flow meter C is connected at one end to an inclined gauge D′ and at the other to a large reservoir E′. A source of constant suction is connected with the outlet and thereby causes a uniform flow of gas at the inlet. The absorbing solution after passing through the absorbing tower flows out through the long tube seal GG′ and may be returned to the bottle H. The inclined gauges are parallel and the inclination may be varied so as to change the sensitiveness to any desired degree. In operation, the flow of the inlet gas through the capillary A is registered upon the gauge D. The residual gas, after the absorption of the hydrogen sulphide and/or sulphur dioxide in the tower, will be smaller in volume and will register on the gauge D′ a decreased flow through the capillary C. The difference in flow is a direct measure of the amount of sulphur dioxide and/or hydrogen sulphide absorbed, and once the apparatus is calibrated a ready and accurate method is provided for the continuous and automatic indication of the amount of sulphur dioxide and/or hydrogen sulphide in the gas.

It is to be noted that my novel method is applicable in determining either sulphur dioxide or hydrogen sulphide where these gases exist separately or in determining both sulphur dioxide and hydrogen sulphide simultaneously where they occur together. The method is particularly useful in determining the total amount of sulphur present as sulphur dioxide, hydrogen sulphide, or both, in a gas mixture, since the volume per unit of sulphur is the same whether the sulphur exists as sulphur dioxide or hydrogen sulphide, and accordingly a change in volume by the absorption of the sulphur dioxide or hydrogen sulphide in the absorbing liquid of my invention will be a direct measure of the amount of sulphur in the gas.

While I have set forth a specific and preferred form of my invention I do not wish to limit myself to the particular chemicals or precise amounts mentioned in the above example, as the use, in combination with a potassium iodide solution of iodine for absorbing sulphur dioxide and/or hydrogen sulphide, of other salts such as magnesium chloride, which substantially repress the solution of carbon dioxide in a manner similar to calcium chloride, and either with or without the addition of an acid, would be carrying out the principle of my invention.

I claim:

1. The herein described method of determining sulphur dioxide and/or hydrogen sulphide in gas mixtures which comprises passing said gas mixture into contact with a solution containing calcium chloride, free iodine, and a small amount of acid, said calcium chloride being present in sufficient amount to substantially repress the absorption of carbon dioxide, and determining the volume change in the gas so treated.

2. The herein described method of determining sulphur dioxide and/or hydrogen sulphide in gas mixtures which comprises passing said gas mixture in contact with an absorbing liquid of the following approximate composition; 100 cc. saturated calcium chloride solution, 27 grams potassium iodide, 9 grams iodine, 58 cc. water and 5 cc. hydrochloric acid (Sp. Gr. 1.18), and determining the volume change in the gas so treated.

3. A liquid composition for separating sulphur dioxide and/or hydrogen sulphide from gas mixtures containing such other gases as carbon dioxide, unsaturated hydrocarbons, hydrogen, carbon monoxide, nitrogen, oxygen and methane comprising a solution of calcium chloride, free iodine and a small amount of free acid, said calcium chloride being present in such amount as to substantially repress absorption of carbon dioxide.

4. A liquid composition for separating sulphur dioxide and/or hydrogen sulphide from gas mixtures comprising such other gases as carbon dioxide, unsaturated hydrocarbons, hydrogen, carbon monoxide, nitrogen, oxygen and methane, comprising a potassium iodide solution of iodine, a small amount of acid, and calcium chloride, said calcium chloride being present in such amounts as to substantially repress the absorption of carbon dioxide.

5. A liquid composition for separating sulphur dioxide and/or hydrogen sulphide from gas mixtures containing such other gases as carbon dioxide, unsaturated hydrocarbons, hydrogen, carbon monoxide, nitrogen, oxygen and methane, comprising approximately 100 cc. saturated calcium chloride solution, 27 grams potassium iodide, 9 grams iodine, 58 cc. water and 5 cc. hydrochloric acid (Sp. Gr. 1.18).

6. The herein described method of determining sulphur dioxide and/or hydrogen sulphide in gas mixtures which comprises passing the gas mixture into contact with a solution containing free iodine and a salt of the group consisting of calcium chloride and magnesium chloride, said salt being present in amount sufficient to substantially repress the absorption of carbon dioxide in the iodine solution, and determining the volume change in the gas so treated.

7. The herein described method of determining sulphur dioxide and/or hydrogen sulphide in gas mixtures which comprises passing said gas mixture into contact with a solution containing free iodine and a chloride of an alkaline earth metal adapted to substantially repress the absorption of carbon dioxide in the iodine solution, and determining the volume change in the gas so treated.

8. The herein described method of determining sulphur dioxide and/or hydrogen sulphide in gas mixtures which comprises passing said gas mixture into contact with a solution containing free iodine and a salt of the group consisting of calcium chloride and magnesium chloride adapted to substantially repress the absorption of carbon dioxide in the iodine solution, and determining the volume change in the gas so treated.

9. A liquid composition for separating sulphur dioxide and/or hydrogen sulphide from gas mixtures containing such other gases as carbon dioxide, unsaturated hydrocarbons, hydrogen, carbon monoxide, nitrogen, oxygen and methane, comprising a solution of free iodine and a chloride of an alkaline earth metal adapted to substantially repress the absorption of carbon dioxide therein.

10. A liquid composition for separating sulphur dioxide and/or hydrogen sulphide from gas mixtures containing such other gases as carbon dioxide, unsaturated hydrocarbons, hydrogen, carbon monoxide, nitrogen, oxygen and methane, comprising a solution of free iodine and a salt of the group consisting of calcium chloride and magnesium chloride adapted to substantially repress the absorption of carbon dioxide therein.

In testimony whereof, I affix my signature.

ARTHUR H. HENNINGER.